United States Patent
Parikh et al.

(10) Patent No.: US 6,175,367 B1
(45) Date of Patent: *Jan. 16, 2001

(54) METHOD AND SYSTEM FOR REAL TIME ILLUMINATION OF COMPUTER GENERATED IMAGES

(75) Inventors: Vimal Parikh, Fremont; Carroll Philip Gossett, Mountain View, both of CA (US)

(73) Assignee: Siligon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/839,035

(22) Filed: Apr. 23, 1997

(51) Int. Cl.$^7$ .................................................. G06T 15/50
(52) U.S. Cl. .......................................... 345/426; 345/426
(58) Field of Search ............................................. 345/426

(56) References Cited

U.S. PATENT DOCUMENTS

| | | | |
|---|---|---|---|
| 4,709,231 | * 11/1987 | Sakaibara et al. | 340/729 |
| 5,163,126 | * 11/1992 | Einkauf et al. | 395/123 |
| 5,457,775 | * 10/1995 | Johnson, Jr. et al. | 395/141 |
| 5,659,671 | * 8/1997 | Tannenbaum et al. | 395/126 |
| 5,739,820 | * 4/1998 | Lyon | 345/426 |
| 5,903,272 | * 5/1999 | Otto | 345/421 |

OTHER PUBLICATIONS

Computer Graphics: Principles & Practice: Second Edition Foley, Van Dam, Feiner, Hughes: pp.:8–11, 723–731, 1095–1096, Nov. 1993.*

Interactive Computer Graphics: Edward Angel pp.:125–131, 1996.*

* cited by examiner

*Primary Examiner*—Mark Zimmerman
*Assistant Examiner*—Mano Padmanabhan
(74) *Attorney, Agent, or Firm*—Wagner, Murabito & Hao LLP

(57) ABSTRACT

The present invention provides a method for shading an image comprised of polygons in a graphics system. Each vertex of a polygon has x, y, and z coordinates, a normalized light source vector (L), a normalized surface normal vector (N), a normalized half-angle vector (H), and a specular exponent (s). The present invention selects a polygon and computes the angles between vectors N and L for each of the vertices. It also computes the difference terms between vectors N and H for each of the vertices. Then, the method of the present invention selects a pixel in the polygon to shade. It interpolates an angle between vectors N and L for the pixel based on the angles evaluated for the vertices. Based on the interpolated angle, a diffuse term for the pixel is determined. The present invention also determines a specular term for the selected pixel. It first interpolates a difference term between vectors N and H for the pixel based difference terms for each of the vertices. The specular term for the pixel is then determined from the difference term at the pixel. The method of the present invention then determines a color for the pixel by incorporating the diffuse term and the specualar term according to a Phong lighting equation.

36 Claims, 10 Drawing Sheets

METHOD AND SYSTEM FOR REAL TIME ILLUMINATION OF COMPUTER GENERATED IMAGES

BACKGROUND OF THE INVENTION

1. Field of the Invention

The present invention relates to the field of computer controlled graphics display systems. More specifically, the present invention relates to a method and system for real time illumination of computer generated images.

2. Background Art

With the advent of graphics based operating systems, graphical user interfaces have become the dominant mode of interacting with computers. Such a progress was made possible due in large part to the innovations in computer graphics. Computer graphics, in a practical sense, concerns the representation of real or imaginary objects based on their computer-based models for interaction with computer users.

In the evolution of computer graphics, rendering a realistic image of a real or imaginary object has been a prime goal for researchers and users alike. At the cutting edge in this quest for realism in computer graphics lies three dimensional (3D) graphics systems. However, rendering realistic 3D images in a graphics system has been slow in coming because it requires enormous and costly computing resources.

One of the most important factors in rendering realistic 3D graphics images is shading. Specifically, rendering realistic 3D graphics requires accurate and efficient modeling of 3D surfaces based upon the position, orientation, and characteristics of the surfaces and the light sources illuminating them. In computer graphics, illumination or lighting model refers to factors determining a surface's color at a given point, usually a pixel, and is typically represented by a lighting equation. Shading, on the other hand, refers to systematic utilization of the illumination or lighting model to render an image. Well known lighting and shading models are discussed in detail in *Computer Graphics: Principles and Practice* by James D. Foley, et al., Addison-Wesley (1996).

In order to produce realistically shaded 3D images in computer graphics systems, the interaction between lights and surface must be modeled for replication. However, due to complexities of such interactions which are based on rules of optics and thermal dynamics, traditional modeling has been based largely on approximations and simplifications. To this date, two shading methods have been popular with computer graphics professionals.

In 1971, Gouraud first proposed a shading method ("Gouraud shading") using intensity interpolation. Under Gouraud shading, intensity is determined at each vertex of a polygon, typically a triangle. Then, each polygon is shaded by linear interpolation of vertex intensities along each edge and then between edges. However, since this method did not determine intensities at individual pixels, it did not provide realistic shading of images.

A few years later, Phong Bui-Tuong proposed a shading method for determining colors at each individual pixel. He formulated a lighting model derived largely from empirical observations. Bui-Tuong, Phong, "Illumination for Computer Generated Pictures," CACM, 18(6), June 1975, 311–317. The original Phong model used a reflection vector to compute the position and extent of specular highlights on objects. J. Blinn simplified the Phong equation by using a half-angle vector between the light vector and the eye vector. In both cases, 3D surfaces were shaded by computing a color value at each pixel. Hence, Phong shading was more accurate and realistic than Gouraud shading. At the same time Phong shading was more difficult to implement because it required far more computer graphics resources than Gouraud shading.

A modified Phong lighting equation ("modified Phong lighting equation"), incorporating color wavelength dependent components and the half-angle vector, computes the color (i.e., intensity) of a pixel according to the following formulation:

$$I_\lambda = I_{a\lambda} k_a O_{a\lambda} + f_{att} I_{p\lambda} [k_d O_{d\lambda} (N \bullet L) + k_s O_{s\lambda} (N \bullet H)^n]$$

where, $I_\lambda$=Intensity or color of a light at a pixel;

$I_{a\lambda}$=Intensity of ambient light;

$k_a$=Ambient-reflection coefficient with range between 0 to 1;

$O_{a\lambda}$=Object's ambient color;

$f_{att}$=Light source attenuation factor;

$I_{p\lambda}$=point light source intensity;

$k_d$=Material's diffuse-reflection coefficient (a constant with a value between 0 and 1);

$O_{d\lambda}$=Object's diffuse color;

$k_s$=Material's specular-reflection coefficient set as a constant between 0 and 1;

$O_{s\lambda}$=Object's specular color;

n=specular exponent (i.e., shininess of the material);

N=surface normal vector at the pixel;

L=light-source vector (pointing from pixel to light) at the pixel; and

H=half-angle vector between light-source vector and eye vector at the pixel.

Another variation of the Phong lighting equation is the Phong-Blinn equation ("Phong-Blinn lighting equation"). This equation computes the color (i.e., intensity) of a pixel according to the following formulation:

$$C = Sa + Attn \times (Ca + Cd \times (N \bullet L) + Cs \times (N \bullet H)^s)$$

where,

C=color of the pixel,

Sa=ambient color of the scene,

Attn=attenuation of light intensity due to distance (local and spot lights),

Ca=ambient color of light*ambient color of material,

Cd=diffuse color of light*diffuse color of material,

Cs=specular color of light*specular color of material, s=specular exponent (i.e., shininess of the material), N=surface normal vector at the pixel, L=light-source vector (pointing from pixel to light) at the pixel, and H=half-angle vector between light-source vector and eye vector at the pixel.

Although the modified Phong lighting equation and the Phong-Blinn equation (hereinafter collectively referred to as "Phong lighting equation") differ in some aspects, they produce similar lighting values. The implementation of the Phong lighting equation requires considerable computing resources to evaluate due mainly to the two dot product terms $N \bullet L$ and $(N \bullet H)^s$. The dot product $N \bullet L$ is a diffuse term which accounts for reflection of light from dull surfaces.

Specular term, represented by $(N \cdot H)^s$, accounts for reflection of light from shiny surfaces as in a highlight off a shiny surface. The dot product $N \cdot H$ is part of the specular term.

The relationship between the vectors, N, L, and H are illustrated in Prior Art FIG. 1. Vector L is a light direction vector pointing from a point P on a 3D surface 100 to a light source, such as a lamp. Vector N is a surface normal vector at point P. Eye vector is a vector pointing from point P to a viewer's eye. Vector H is a half-angle vector bisecting the light vector L and the eye vector. Vector R is a reflection vector that was used in determining a specular term in the original Phong lighting equation.

In the Phong shading method, the N vector at a point (i.e. pixel) is typically interpolated between the three vertices of a triangle. The light vector L and the half-angle vector H at a given pixel are constant over a triangle for lights and viewer at infinity. However, for local lights, the L vector at the pixel is also interpolated in a similar manner. Likewise, for a local viewer, the H vector at the pixel is similarly interpolated. Hence, at a given pixel, for a local light and a local viewer, all three vectors N, L, and H are linearly interpolated based on the N, L, and H vectors of the vertices of a polygon. In an exemplary triangle, linear interpolation of N, L, and H vectors at a given pixel would involve 9 vectors: three vectors N, L, and H at each of the three vertices.

The linear interpolation of N, L, and H vectors at a given pixel yields vectors whose orientations (i.e. directions) are accurate interpolations, but whose lengths (i.e. magnitudes) depart from the interpolation scheme. Hence, the interpolated vectors N, L, and H must be normalized before being used in the Phong equation above. The normalization involves an inverse square-root operation. After normalization, the diffuse term is computed by evaluating the dot product $N \cdot L$. The specular term is determined by evaluating the dot product $N \cdot H$ raised to a power s. The diffuse and specular terms are then used in the above equation along with the other well known variables to produce a color at a given pixel.

These remaining variables and the method of determining their values are well known in the art and have been routinely implemented without undue difficulty in graphics systems. Those desiring further information on the Phong lighting equation and related variables are referred to *Computer Graphics: Principles and Practice* by James D. Foley, et al., Addison-Wesley (1996), 772–731, ISBN 0-201-84840-6, which is incorporated herein by reference as a part of this background material.

All these vector and dot product calculations translate into extensive and costly hardware resources. Moreover, in order to calculate the dot products, all three vectors, N, L, and H must be determined at every single pixel corresponding to a point on a surface and then normalized by brute force method. Given that even the low-end color monitors of today have more than half-a-million pixels, which are comprised of three sub-pixels in turn, the Phong lighting equation becomes prohibitively costly and slow to implement in computer graphics systems.

Recognizing the costly nature of the brute force approach, several methods have been devised to implement the Phong lighting equation in a more efficient way in terms of cost, hardware, and speed. In one case, Kuijk and Blake used angular interpolation. A. A. M Kuijk & E. H. Blake, *Faster Shading via Angular Interpolation*, Comp. Graphics Forum 8 (1989), 315–324. In another case, Claussen used two approaches: one without re-normalization of surface normal vector, and the other with re-normalization of surface normal vector. Ute Claussen, *Real Time Phong Shading*, Proceedings of the Eurographics 90, 29–36. However, Claussen method applied the Phong equation directly without any reduction. In both cases, the hardware costs were still high and resulting shading sacrificed realism for speed, cost, and simplicity.

In contrast, Bishop and Weimer used a novel approach of converting the entire Phong equation to a second degree Taylor expansion and then using forward differences to evaluate the equation at each pixel. Bishop, G. & Weimer, D. M., *Fast Phong Shading*, Proceedings of SIGGRAPH, 1986, 103–106. However, this method still entailed a high setup cost in computing the coefficients of the Taylor series. Further, it proved suitable only for iterative scan line renderers where forward differences could be implemented. Hence, graphics system designers were faced with expensive, slow but highly realistic shading effects or cheap, fast graphics system with shading effects falling short on realism.

Thus, what is needed is a computer graphics system and method that implement the Phong lighting model for shading 3D images more efficiently at each pixel while retaining close approximation to the Phong lighting equation. What is further needed is a system and method that reduce resource intensive calculations involved in normalization and the dot product computations. It is preferable if such a system and method for shading 3D images allow hardware implementation of the Phong lighting method.

Accordingly, the present invention provides a solution whereby computer controlled graphics display systems and methods for shading a 3D image efficiently and closely approximates Phong shading in real time. The present invention reduces resource intensive normalization and dot product computations involved in the Phong lighting model. Furthermore, the present invention provides a computer controlled graphics display systems and methods for shading a 3D image that implement the Phong lighting model in hardware.

SUMMARY OF THE INVENTION

The present invention is directed to a method and system for shading a 3D image within a computer graphics system utilizing a Phong lighting equation. The present invention provides a method and system for shading an image comprised of polygons in a graphics system. Each vertex of a polygon has x, y, and z coordinates, a normalized light source vector (L), a normalized surface normal vector (N), a normalized half-angle vector (H), and a specular exponent (s). The present invention selects a polygon and computes the angles between vectors N and L for each of the vertices. It also computes the difference terms between vectors N and H for each of the vertices. Then, the method of the present invention selects a pixel in the polygon to shade. It interpolates an angle between vectors N and L for the pixel based on the angles evaluated for the vertices. Based on the interpolated angle, a diffuse term for the pixel is determined. The present invention also determines a specular term for the selected pixel. It first interpolates a difference term between vectors N and H for the pixel based difference terms for each of the vertices. The specular term for the pixel is then determined from the difference term at the pixel. The present invention then determines a color for the pixel by incorporating the diffuse term and the specular term according to a Phong lighting equation.

BRIEF DESCRIPTION OF THE DRAWINGS

The accompanying drawings, which are incorporated in and form a part of this specification, illustrates embodiments of the invention and, together with the description, serve to explain the principles of the invention.

Prior Art

DETAILED DESCRIPTION OF THE INVENTION

In the following detailed description of the present invention, a method and system for shading 3D images, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer or digital system memory. These description and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

COMPUTER GRAPHICS SYSTEM

Figure 1:
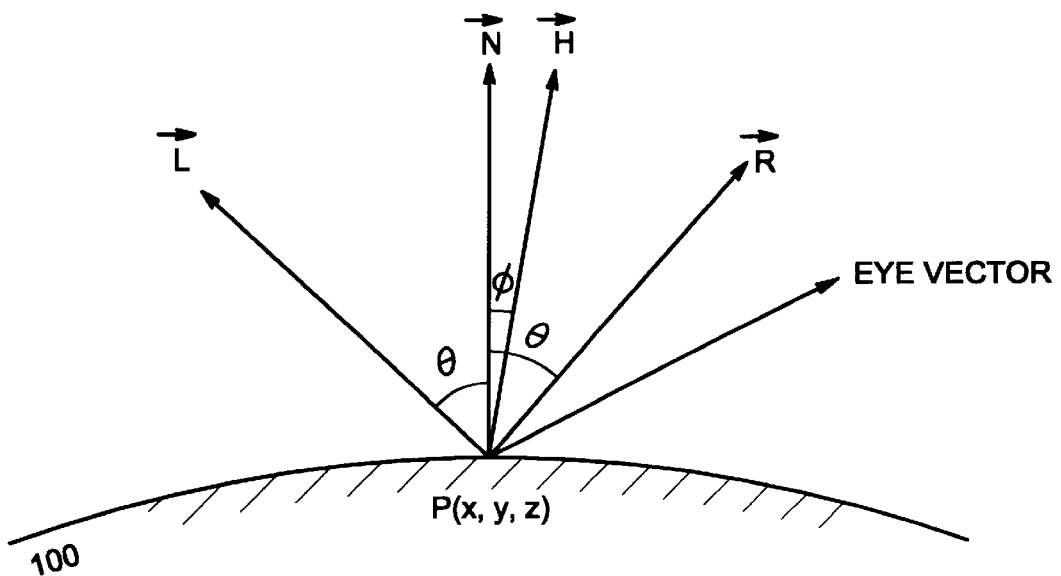
FIG. 1 illustrates relationships between vectors N, L, H, R, and Eye vector, and angles θ and φ at a point P on an image surface.
Figure 2:
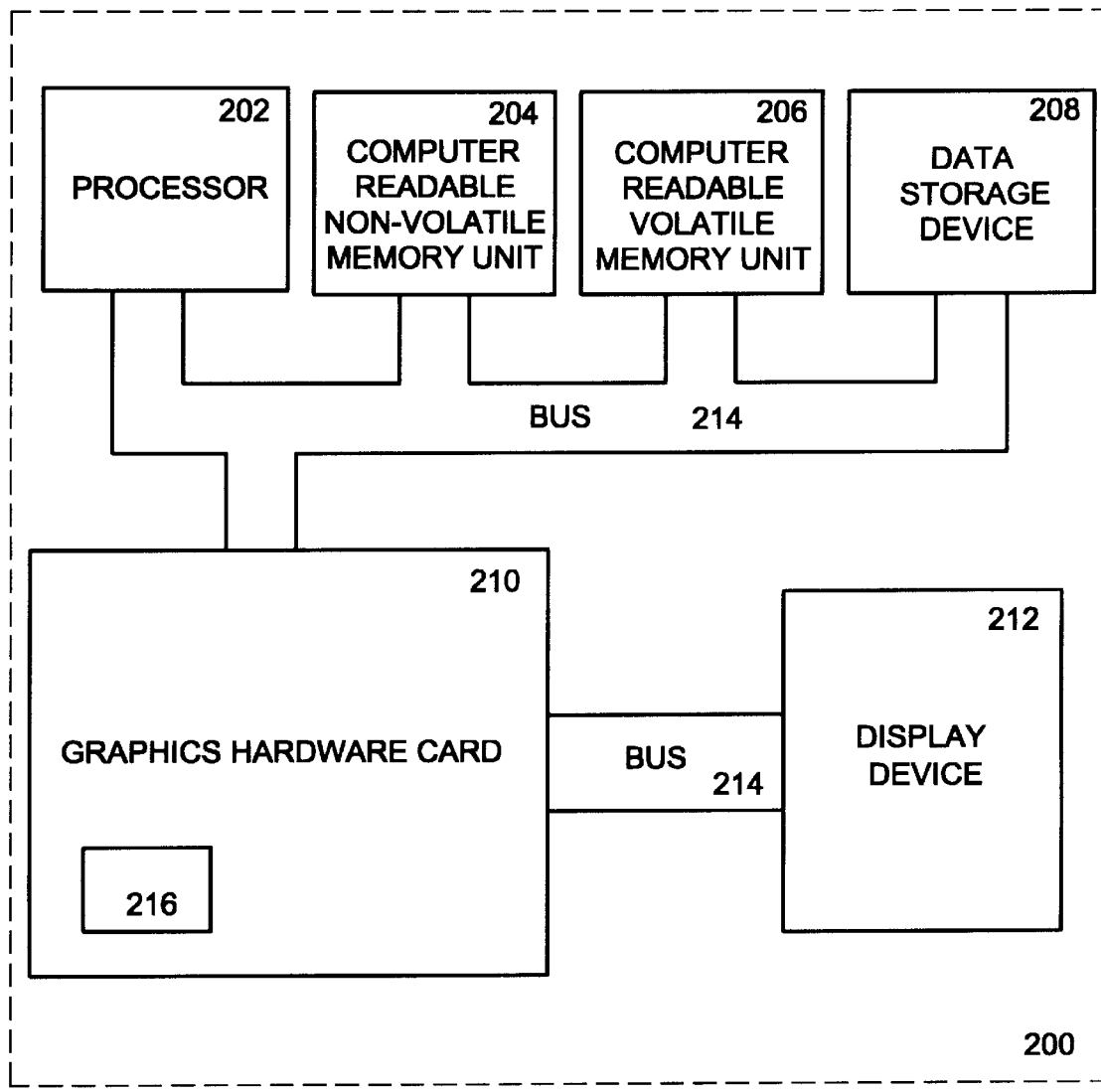
FIG. 2 illustrates a block diagram of an exemplary computer graphics system that can be used in accordance with the present invention.

With reference to FIG. 2, a block diagram is shown of a computer graphics system 200 used in accordance with the present invention. In general, computer graphics system 200 used by an embodiment of the present invention comprises an address/data bus 214 for communicating information, one or more host processors 202 coupled with bus 214 for processing information and instructions, a computer readable volatile memory unit 206 (e.g., random access memory unit) coupled with bus 100 for storing information and instructions (e.g., graphics data) for the host processor 202, a computer readable non-volatile memory unit 204 (e.g., read only memory unit) coupled with bus 214 for storing static information and instructions for the host processor 202, a computer readable data storage device 208 such as a magnetic or optical disk and disk drive (e.g., hard drive or floppy diskette) coupled with bus 214 for storing information and instructions, and a display device 212 coupled to bus 214 for displaying information (e.g., 3D images) to the computer user. The display device 212 utilized with the computer system 200 of the present invention can be a liquid crystal device, cathode ray tube, or other display device suitable for creating graphic images and alphanumeric characters recognizable to the user.

Computer graphics system 200 also provides data and control signals via bus 214 to a graphics hardware unit ("card") 210. The graphics hardware card 210 typically contains a display processor 216 and other specialized hardware units for processing a series of display instructions found within a memory stored display list to render graphics primitives. The display processor 216 supplies data and control signals to a frame buffer (not shown) which refreshes the display device 105 for rendering images (including graphics images).

Rendering realistic images on a 3D graphics computer system necessitates the modeling of smooth and curved surfaces. A common surface modeling method is the polygon mesh technique. A polycon mesh is a collection of edges, vertices, and polygons connected such that each edge is shared by at most two polygons. An edge connects two vertices, and a polygon is a closed sequence of edges. An edge can be shared by two adjacent polygons, and a vertex is shared by at least two edges. Each vertex has an X, Y, and Z coordinate in 3D space. The mathematical descriptions of the polygons are referred to as primitives. The collection of polygons in its entirety, along with connectivity and attribute information, model an object. It will be appreciated that those having ordinary skill in the art will no doubt be familiar with the polygon mesh technique for approximating a surface.

In the present embodiment, these polygons are defined by vertices that are assigned during the polygon mesh modeling process. Each vertex is given a coordinate in a coordinate system such as the X, Y, and Z coordinate system. In addition, a normal vector, a light-source vector, and a half-angle vector are computed for each vertex and assigned to the corresponding vertex. For the present invention, the preferred embodiment of a polygon is a triangle. Although a triangle is used in the present embodiment, those skilled in the art will no doubt appreciate that other polygons are equally suitable to the present invention.

A 3D image to be shaded is thus comprised of a plurality of exemplary triangles in a mesh structure. According to the present embodiment, a color at a given pixel in an exemplary triangle is computed. The 3D image is shaded one pixel at a time and one triangle at a time. Use of polygons to simulate a smooth surface is well known in the art. Although a triangle is used in the present embodiment, those skilled in the art will no doubt recognize that the equation is also suitable for implementation with other polygons. It should also be noted that since the present invention accomplishes 3D shading of images by determining a color value for a given point, typically a pixel, the terms "point" and "pixel" are used interchangeably in the present invention.

The present invention includes a method and system for shading 3D images comprised of a plurality of polygons, preferably triangles, within a computer graphics system utilizing the well known Phong lighting equation previously defined above.

Figure 3:
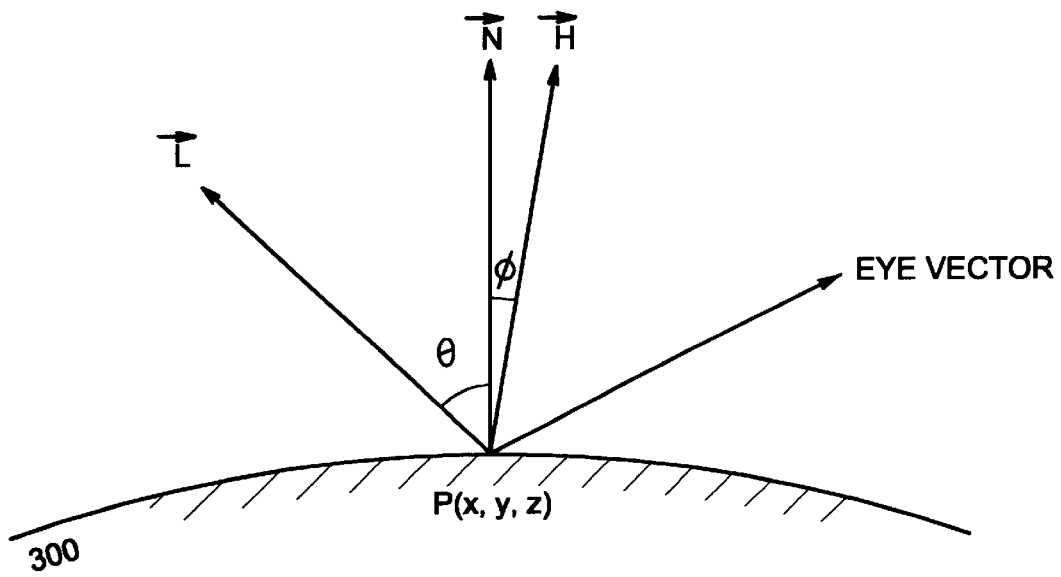
FIG. 3 illustrates relationships between vectors N, L, H, and Eye vector, and angles θ and φ at a point P on an image surface.

The relationship between the vectors, N, L, and H used is the Phong lighting equation is illustrated in FIG. 3. Vector L is a light direction vector pointing from a point P on a 3D surface 300 to a light source, such as a lamp. Vector N is a surface normal vector at point P. Eye vector (V) is a vector pointing from point P 302 to a viewer's eye. Vector H is a half-angle vector bisecting the light vector L and the eye vector. Then, by a simple vector addition, H can be defined as the sum of two vectors L and V. In the above Phong lighting equation, H is normalized and is defined as $(L+V)/|L+V|$. In the present invention, the vectors N, L, and H are normalized at each vertex of an exemplary triangle. Hence, the magnitude of a normal vector N, a light-source vector L, and a half-angle vector at a vertex are that of a unit vector.

The implementation of the Phong lighting equation requires calculation of two dot products, N•L and $(N•H)^s$ at each pixel. The diffuse term in the equation is represented by N•L. The specular term is represented by $(N•H)^s$.

COMPUTING THE DIFFUSE TERM N•L

The diffuse term N•L accounts for diffuse reflectance at a given point and depends only upon the light source vector and the surface normal vector. It is independent of the viewing position or viewing angle. Since by definition N•L=|N||L| cos θ, the diffuse reflectance is maximum when the normal points to the light source because cosine term is maximum when the angle between N and L is 0 degrees.

Figure 4:
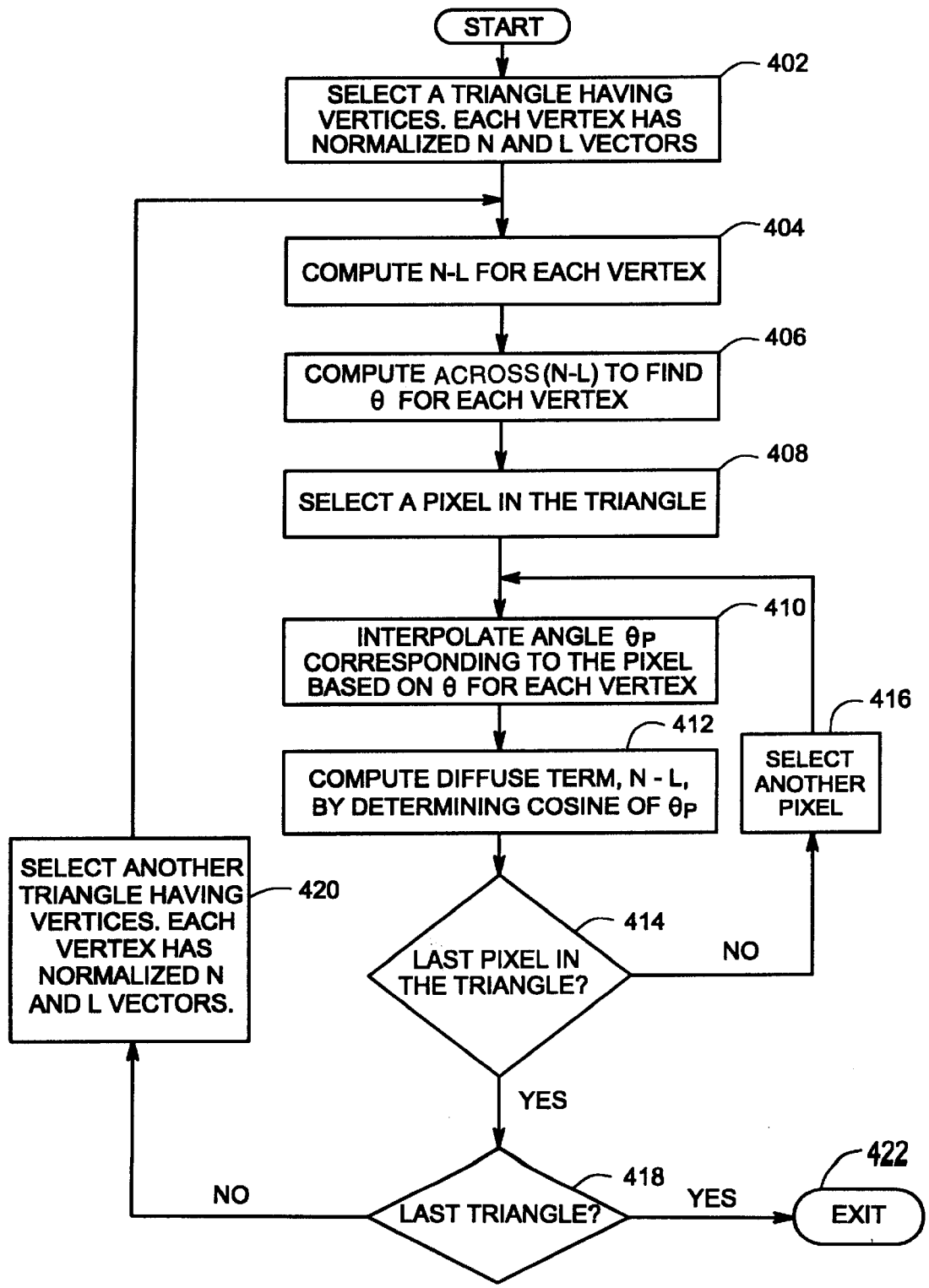
FIG. 4 illustrates a flow diagram of the steps involved in computing the diffuse term, N•L, for each of the pixels of a triangle.

FIG. 4 illustrates a flow diagram of the steps involved in computing the diffuse term, N•L, for each of the pixels of a triangle. The steps detailed in the flow diagram are implemented as program instructions stored in computer readable memory units of computer system 200 (FIG. 2) and is executed over processor 202. At step 402, the present embodiment selects an exemplary triangle from a polygon mesh comprising an image. The triangle is defined by three vertices with associated coordinates (x, y, z). Each vertex has normalized N and L vectors.

Since the vectors N and L are normalized, the dot product (N•L) at a given vertex of the exemplary triangle are cosine of the angle θ between vectors N and L. Thus, the diffuse term, N•L, at a given vertex of the exemplary triangle equals cos θ. Having equated N•L with cosine of the angle θ between N and L, the equation can now be solved for the angle between N and L vectors at a given vertex of an exemplary triangle by taking inverse of cosine. Hence, the equation now yields an angle θ of $\cos^{-1}$ (N•L) for each vertex. In the exemplary triangle, the equation yields an angle for each of the vertices for a total of three angles.

Based on these observations, the present embodiment computes N•L for each vertex of the chosen triangle. This corresponds to step 404 in the flowchart in FIG. 4. Then at step 406, the angle θ for each vertex is computed by taking the inverse cosine of N•L. Each angle thus obtained represents the angle between a normal vector N and a light source vector L at its corresponding vertex of the selected triangle.

In step 408 in FIG. 4, the present embodiment selects a pixel within the selected triangle to determine its diffuse term for shading according to the Phong lighting equation. Those in the present art will appreciate that a polygon comprising an image includes an associated set of pixels within its boundary. The methods and systems for selecting and associating pixels with polygons are well known in the art. See e.g., *A Parallel Algorithm for Polygon Rasterization* by Juan Pineda, Siggraph '88 Proceedings, Volume 22, Number 4, 17–20 (1988).

Then in step 410, the angle $\theta_p$ corresponding to the selected pixel is computed by interpolation. The angle $\theta_p$ represents the angle between vectors $N_p$ and $L_p$ at the selected pixel. The interpolation of angle $\theta_p$ is carried out according to a well known linear interpolation method based on the three angles obtained in step 406.

Figure 5:
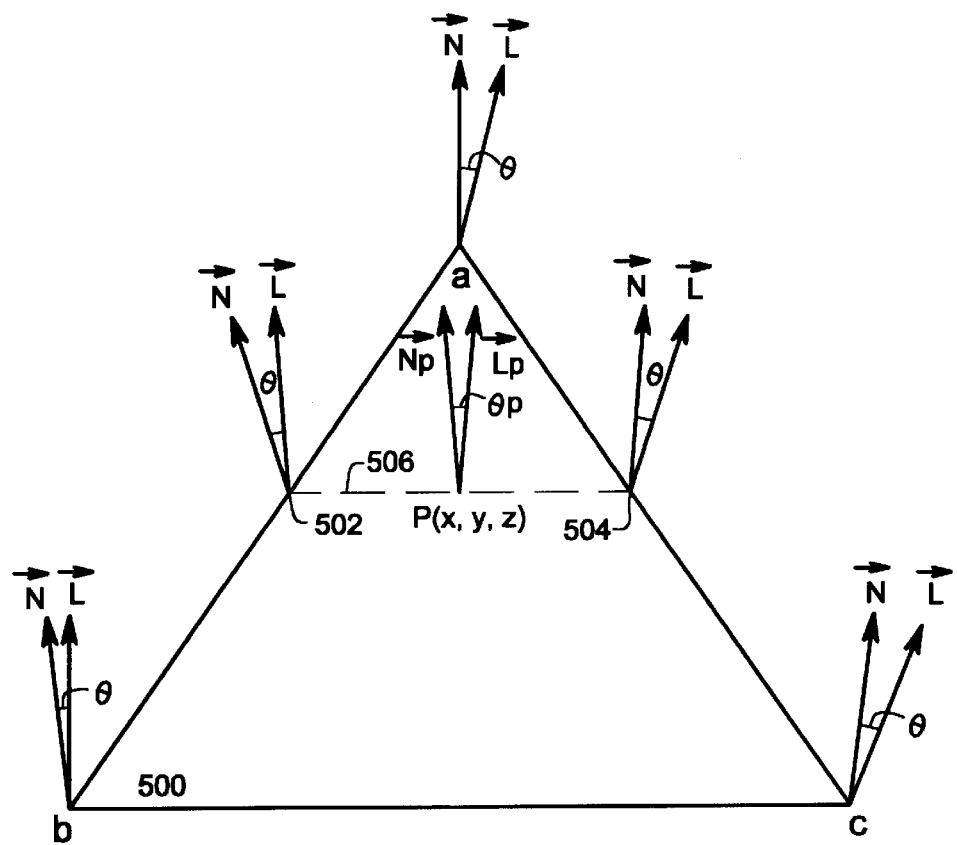
FIG. 5 shows an exemplary triangle to illustrate a well-known prior art linear interpolation method for determining an angle $\theta_p$ at a point P.

FIG. 5 shows an exemplary triangle 500 to illustrate a well-known prior art linear interpolation method for determining an angle $\theta_p$ at a point P. Triangle 500 has vertices a, b, and c. Each vertex has associated vectors N and L, and an angle θ between these vectors. The point P lies on a scan line 506 defined by a starting point 502 and an ending point 504. In order to determine $\theta_p$ at point P, an angle θ at starting point 502 is interpolated between the angles (i.e., θ) of the vertices a and b. Similarly, an angle θ at ending point 504 is then interpolated between the angles (i.e., θ) of the vertices a and c. The desired angle $\theta_p$ at point P is then interpolated based on the interpolated angles at starting point 502 and ending point 504,.

Figure 6:
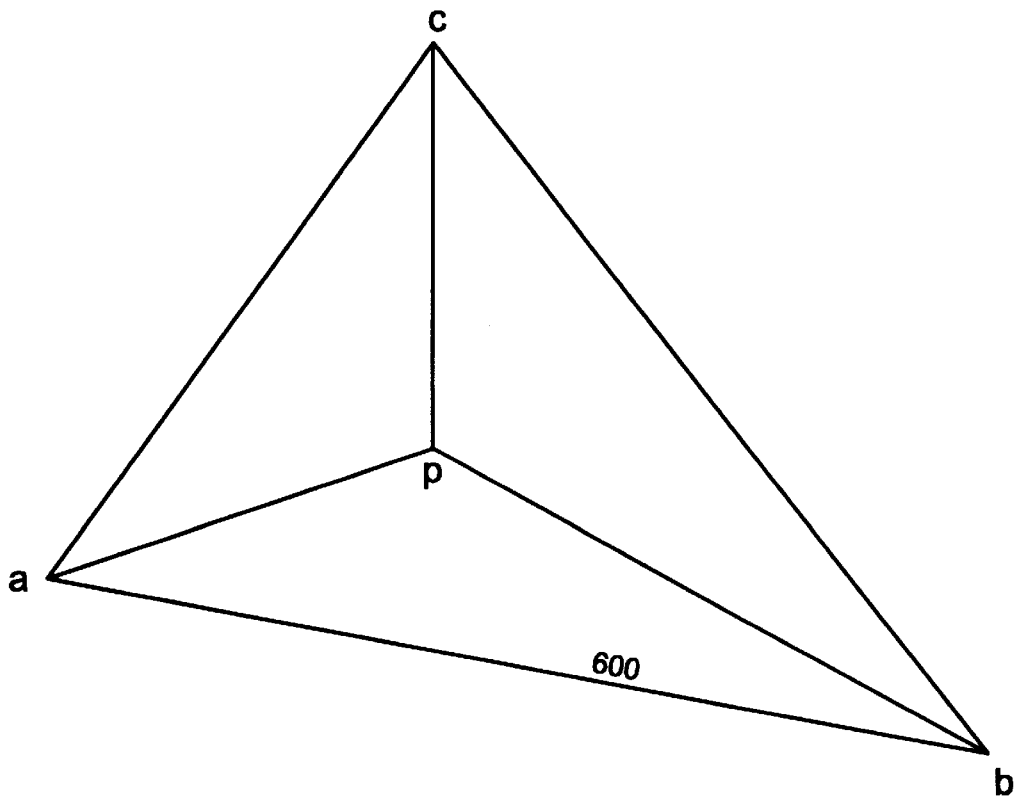
FIG. 6 shows an exemplary triangle to illustrate an alternate triangular bi-linear interpolation method according to a preferred embodiment of the present invention.

FIG. 6 shows an exemplary triangle 600 to illustrate an alternate triangular bi-linear interpolation method according to a preferred embodiment of the present invention. This interpolation method defines two interpolation factors s and t, also known as berrycentric coordinates, as follows:

s=Area of triangle apb/Area of triangle abc, and t=Area of triangle apc/Area of triangle abc.

The areas of the triangles are evaluated, for example, by using the standard formula, (base*height)*½. The base and height of the triangles are derived from the x, y, and z coordinates of the vertices. Based on the s and t factors, the present embodiment interpolates $\theta_p$ at point P according to the following formula:

$$\theta_p = \theta_a + (\theta_b - \theta_a)t + (\theta_c - \theta_a)s,$$

where, $\theta_a$, $\theta_b$, and $\theta_c$ are the angles between the vectors N and L at the corresponding vertices as described above.

These linear interpolation methods used in determining angle $\theta_p$ of the present embodiment are well known to those skilled in the relevant art. Although such interpolation methods are employed in the present invention, other interpolation methods are equally suitable for purposes of the embodiments of the present invention. It should also be noted that the above interpolation methods can be used in conjunction with any polygons since polygons can always be represented by a number of triangles. It would merely add a well known step of dividing the polygons into triangles.

The angle $\theta_p$ obtained above by interpolation represents the angle between vectors $N_p$ and $L_p$ and is equivalent to arccos of the diffuse term, $N_p \cdot L_p$, at the pixel. Hence, the diffuse term at the selected pixel is simply $\cos \theta_p$. Accordingly, in step 412 of FIG. 4, the present invention computes the diffuse term for the pixel by evaluating the cosine of $\theta_p$. In an alternative embodiment, the diffuse term is evaluated by looking up a corresponding cosine value of $\theta_p$ in a lookup table.

After computing the diffuse term for the selected pixel, the present invention proceeds to compute a diffuse term for another pixel in the triangle as shown in steps 414 and 416 of FIG. 4. If the diffuse terms for all the pixels in the triangle have been computed, the present invention proceeds to select another triangle through steps 418 and 420 of FIG. 4. When the diffuse terms for all pixels in all triangles of the polygon mesh comprising an image have been computed, the present embodiment terminates at step 422.

The embodiments of the present invention has many advantages over conventional Phong lighting method, including avoiding dot product calculations at each pixel. In addition, instead of interpolating six vectors (3 each for N and L) to obtain two interpolated vectors, $N_p$ and $L_p$, in traditional Phong method, the present embodiment interpolates only three angles at the vertices of a triangle to obtain a single term, $\theta_p$. Furthermore, since the present embodiment does not compute the vectors $N_p$ and $L_p$, it dispenses entirely with the requirement of normalizing these vectors. Even though the present embodiments determine a diffuse term as applied to a Phong lighting equation, those skilled in the art will recognize that the present embodiment is equally applicable to other lighting equations and models that utilize a diffuse term defined by N•L or equivalents thereof.

COMPUTATION OF THE SPECULAR TERM. (N•H)$^s$

The specular term, (N•H)$^s$, involves a dot product between the normal and the half-angle vectors raised to a specular exponent, s. The specular exponent is a constant corresponding to the reflectance of a material. The shinier the surface of the material, the higher the power. Hence, a surface having a high specular exponent will produce a very sharp highlight. Values of specular exponents can vary from 1 to several hundred; however, typical values of specular exponents range from 10 to 50. For instance, a shiny metallic surface may have a specular exponent value of about 50, while a plastic surface may have a value of about 10. For most surfaces, it is rare for the specular exponent to be below 10.

In the present embodiment, unlike the diffuse term calculation, the angle $\phi$ at a given pixel cannot be interpolated accurately for specular term because the intensity fall off is steep. The sharp fall off of the specular term as the angle $\phi$ between N and H increases is due to the specular exponent, s, which typically ranges from 10 to 50. The drop in intensity is even greater for higher values of shininess. This means that the angle must be computed using two or more independent variables. That is, the specular term is significant only for small values of $\phi$.

Hence, based on the assumption that the angle $\phi$ between the surface normal vector N and half-angle vector H at a given pixel is small, the relationship between N and H can be described in an alternative manner as follows:

$\sin(\phi) = |N-H|/|H|$.

For small $\phi$, $\sin\phi = \phi$ and $|H| = 1$ by definition; hence the angle $\phi$ can be approximated as follows:

$\phi = |N-H|$.

Thus, for small values of $\phi$, the angle $\phi$ between N and H vectors at a given pixel can be approximated by $|N-H|$ ("difference term").

As in the dot product in the diffuse term, the dot product N•H is defined as $|N||H|\cos\phi$. Since N and H are normalized vectors with a magnitude of 1, the dot product N•H at a given pixel is equivalent to $\cos \phi$. Hence, the specular term with its specular exponent term can be described as a power cosine function. The Taylor series expansion of the cosine function, $\cos(\phi)$, is as follows:

$$\cos(\phi) = 1 - X^2/2! + X^4/4! - X^6/6! + \ldots$$

On the other hand, the Taylor series function of the Gaussian distribution function, $e^{-x^2}$, is as follows:

$$e^{-x^2} = 1 - X^2 + X^4/2! - X^6/3! + \ldots$$

Close examination reveals significant similarities between the Taylor series expansions of the cosine function and the Gaussian distribution function. First, the powers of X are identical in both series expansions. Second, the order of signs in both series is the same, alternating from positive to negative. Hence, the first two or three terms of the Gaussian distribution function give a good approximation of the cosine function. Furthermore, if both series are raised to a power, s, to account for the specular exponent, the difference between these two functions becomes even smaller. Since the typical values of specular exponents are in the range of 10 to 50, the difference between $\cos^s(\phi)$ and the Gaussian distribution function raised to the power of s becomes insignificant in most cases. Consequently, the Gaussian distribution function can be used to approximate the cosine function.

As mentioned above, the Gaussian distribution function, $e^{-x^2}$, has been shown to be a good approximation for the cosine function, $\cos(\phi)$. If $X' = \phi/\sqrt{2}$, then by substitution, the following equation is derived:

$$\cos(\phi) = e^{-x'^2} = e^{-(\phi)^2/2}.$$

Based on this approximation, the specular term can now be expressed as a Gaussian function which is computed by substitution as follows:

$$(Np \cdot Hp)^s = e^{-s(|Np-Hp|)^2/2} = e^{-s(|Npx-Hpx|)^2/2} * e^{-s(|Npy-Hpy|)^2/2} * e^{-s(|Npz-Hpz|)^2/2},$$

where.

Np = the surface normal vector at the pixel,

Hp = the half-angle vector at the pixel,

Npx = the x component of surface normal vector at the pixel,

Npy = the y component of surface normal vector at the pixel,

Npz=the z component of surface normal vector at the pixel,

Hpx=the x component of half-angle vector at the pixel,

Hpy=the y component of half-angle vector at the pixel, and

Hpz=the z component of half-angle vector at the pixel.

The value of the original Gaussian function, $e^{-x^2}$, is typically found by a table lookup method. That is, the index term, x, is used as an address index to a lookup table containing the values of Gaussian distribution function. In order to take advantage of such method, an index term for the specular term, $e^{-s(|Np-Hp|)^2/2}$, equivalent to index, x, of the original Gaussian function, must be computed by matching the exponent terms. By a straight forward comparison and substitution, the index term for the specular term is computed to be $\sqrt{s}*(|Np-Hp|)/\sqrt{2}$. In the present embodiment, this index term is decomposed into three indices corresponding to x, y, and z components for determining Gaussian values for each component.

Figure 7:
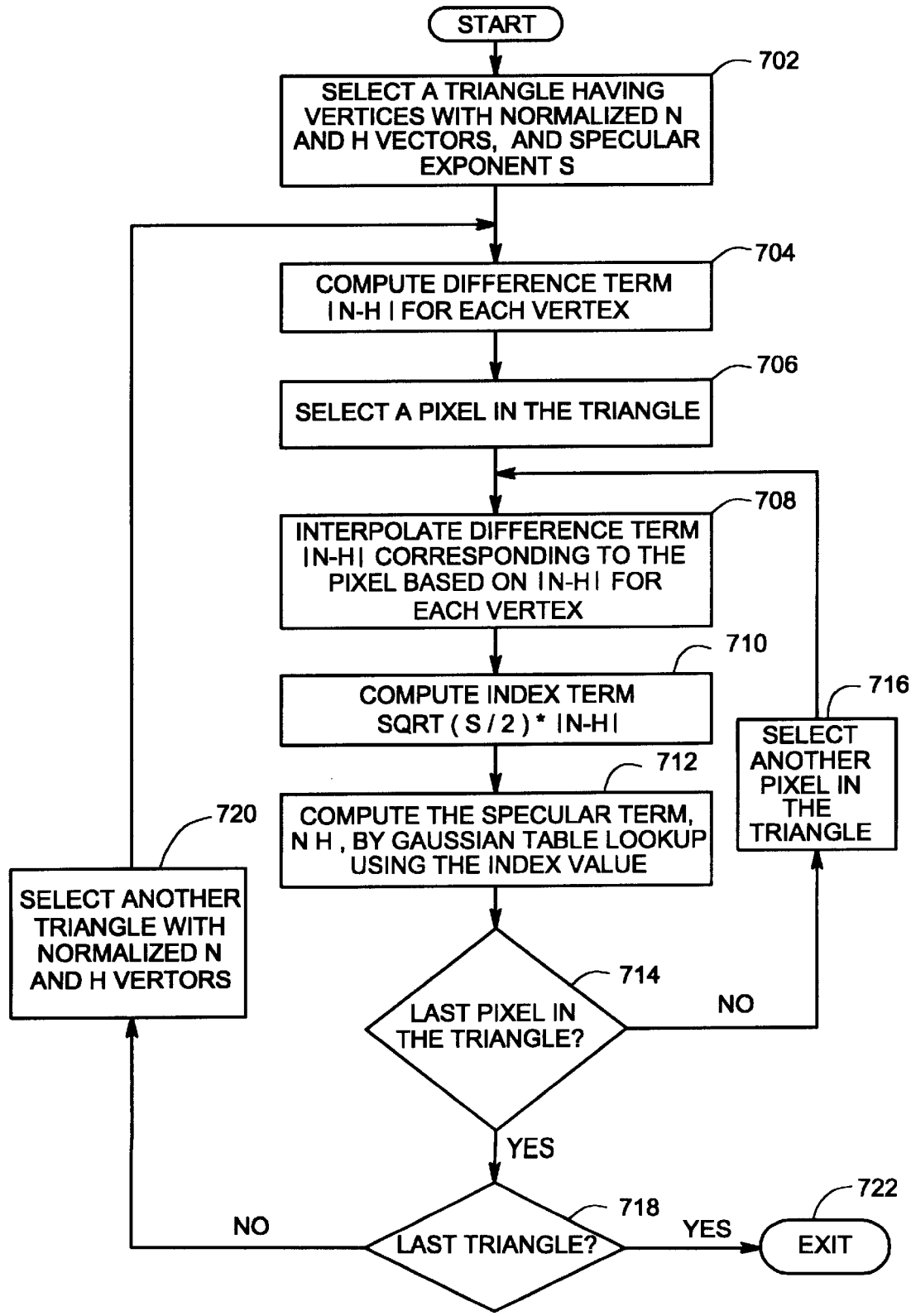
FIG. 7 illustrates a flow diagram of the steps involved in computing the specular term, $(N•H)^s$, for each of the pixels of an exemplary triangle.

Based on these derivations, the present embodiment computes the specular term, $(N\cdot H)^s$, for each of the pixels of a triangle in a polygon mesh comprising an image. FIG. 7 illustrates a flow diagram of the steps involved in computing the specular term, $(N\cdot H)^s$, for each of the pixels of an exemplary triangle. The steps detailed in the flowchart are implemented as program instructions stored in computer readable memory units of computer system 200 (FIG. 2) and is executed over processor 202. At step 702, the present embodiment selects an exemplary triangle from a polygon mesh comprising an image. The triangle is defined by three vertices with associated coordinates (x, y, z). Each vertex has normalized N and H vectors. Then at step 704, the present embodiment computes a difference term, |N−H|, for each vertex of the selected triangle.

In step 706, the present embodiment selects a pixel in the triangle to determine its specular term for shading. Those in the present art will no doubt recognize that a polygon comprising an image includes an associated set of pixels within its boundary. The methods and systems for selecting and associating pixels with polygons are well known in the art.

Then in step 708, the present embodiment interpolates the difference term, |Np−Hp|, for the selected pixel based on the three difference terms obtained for each vertex of the triangle.

In conventional Phong shading methods, the vectors Np and Hp at each pixel are obtained by the linear interpolation method previously used in the diffuse term interpolation above. This interpolation is based on six terms, N and H vectors at each vertex of a triangle.

Figure 8:
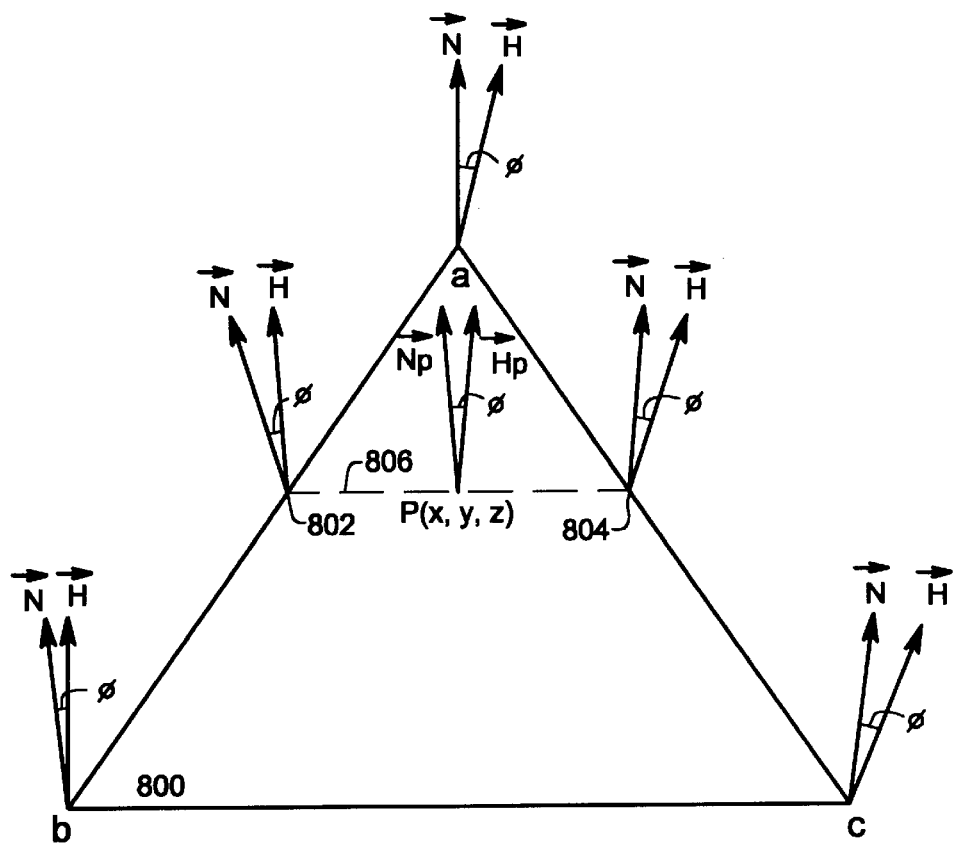
FIG. 8 shows an exemplary triangle to illustrate a linear interpolation method used in determining the difference term |Np−Hp| at a point P.

In contrast, in the present embodiment, instead of interpolating Np and Hp vectors at each pixel, the difference term |Np−Hp| is interpolated for a given pixel based on the vertices of an exemplary triangle. FIG. 8 shows an exemplary triangle 800 to illustrate a linear interpolation method used in determining the difference term |Np−Hp| at a point P. Triangle 800 has vertices a, b, and c. Each vertex has associated vectors N and H. The point P lies on a scan line 806 defined by a starting point 802 and an ending point 804. In order to determine the difference term |Np−Hp| at point P, the difference term |N−H| at starting point 802 is interpolated between the difference terms of the vertices a and b. Likewise, the difference terms of |N−H| at ending point 802 is interpolated between the difference terms of the vertices a and c. The desired difference term of |Np−Hp| at point P is then interpolated based on the interpolated difference terms of starting point 802 and ending point 804. The interpolation technique used in the present embodiment is the linear interpolation method used above in determining the angle $\theta_p$ in diffuse term calculation.

An alternate embodiment of the present invention also utilizes the triangular bi-linear interpolation method described above in interpolating the angle $\theta_p$ in reference with FIG. 6. This interpolation method defines two interpolation factors s and t, also known as berrycentric coordinates, as follows:

s=Area of triangle apb/Area of triangle abc, and t=Area of triangle apc/Area of triangle abc.

Based on these coordinates, the present embodiment interpolates |Np−Hp| at point P according to the following formula:

$$|Np-Hp|=|N-H|_a+(|N-H|_b-|N-H|_a)t+(|N-H|_c-|N-H|_a)s,$$

where, $|N-H|_a$, $|N-H|_b$, and $|N-H|_c$ are the difference terms at the corresponding vertices as described above.

The interpolation methods used in determining the difference term |Np−Hp| in the present embodiment are well known to those skilled in the art. Although such interpolation methods are employed in the present invention, other interpolation methods are equally suitable for the present invention. It should also be noted that the above interpolation methods can be used in conjunction with any polygons since polygons can always be represented by a number of triangles. It would merely add a well known step of dividing the polygons into triangles.

In an alternative approach, instead of interpolating the difference term |Np−Hp|, the constituent x, y, and z components of |Np−Hp| are interpolated according to the above interpolation method. In this embodiment, three difference terms are computed for each x, y, and z components: |Npx−Hpx|, |Npy−Hpy|, and |Npz−Hpz|.

At step 710 in FIG. 7, the present embodiment computes an index value, $\sqrt{s}*(|Np-Hp|)/\sqrt{2}$. In an alternative embodiment, the index values are determined for each x, y, and z difference term components |Npx−Hpx|, |Npy−Hpy|, and |Npz−Hpz|.

Then at step 712 in FIG. 7, the present embodiment computes the specular term at point P by a Gaussian table lookup method using the index value. In the present embodiment, the specular term is computed by a table lookup means, such as a ROM or a RAM, which stores the Gaussian distribution function values. In particular, the computed index values of $\sqrt{s}*(|N-H|)/\sqrt{2}$ for each component of x, y, and z are used as indices for the table lookup means to obtain an equivalent Gaussian value. The x, y, z components of the specular term are then multiptied together to produce a single specular term.

After computing the specular term for the selected pixel, the present invention proceeds to compute a specular term for another pixel in the triangle as shown in steps 714 and 716 of FIG. 7. If the specular terms for all the pixels in the triangle have been computed, the present invention proceeds to select another triangle through steps 718 and 720 of FIG. 7. When the specular terms for all pixels in all triangles of the polygon mesh comprising an image have been computed, the process terminates at step 722.

The present embodiment of the invention has many advantages over conventional Phong shading method. The present invention avoids the direct computation of the dot product N•H at each pixel. In addition, the computation of the dot product N•H raised to a power s at each pixel is avoided. Instead, the present embodiment interpolates |N−H| for each pixel based on the N and H vectors at the vertices and then determines the specular term by a simple look-up table means. Furthermore, instead of interpolating Np and Hp vectors at each pixel based on six vectors at three vertices, the present embodiment calculates the difference term |N−H| at the three vertices and then interpolates the difference term |Np−Hp| at each pixel. This significantly reduces computations involving vector interpolation. Although the present embodiments determine the specular term as applied to a Phong lighting equation, those skilled in the art will recognize that the present embodiments are equally suitable to other lighting equations and models that utilize a specular term defined by $(N \cdot H)^s$ or any portions or equivalents thereof.

SHADING A PIXEL ACCORDING TO A PHONG LIGHTING EQUATION

After the diffuse and specular terms have been evaluated, the present embodiment shades a pixel by determining the color of the pixel by incorporating the remaining variables in the Phong lighting equation. The method of determining these remaining variables and the method of incorporating them in the Phong lighting equation are well known to those having ordinary skill in the art. Although the Phong lighting method has been described and implemented in varying degrees, its basic principal underlying the variations remains the same. It will be appreciated that the embodiments of the present invention are equally suitable to other variations of Phong lighting equations and/or shading methods. Although the currently preferred embodiments utilizes Phong lighting equations, those in the relevant art will recognize that the present embodiments are well suited to other lighting equations that utilize the diffuse and/or specular terms or any portions or equivalents as described herein.

Those skilled in the art will no doubt appreciate that colored lights and surfaces are commonly represented by separate equations for each component of the color model. In the present embodiment, the values of each of the remaining variables used above, namely Cd, Cs, Ca, and Sa, are represented as having components of red (R), green (G), and blue (B) colors in the RGB color model. Hence, the above addition and multiplication are carried out component by component for each color. Thus, the resulting shading color, in turn, will have three components of R, G, and B. In the present embodiment, these components are then fed into sub-pixels of corresponding colors to produce a single coherent color for the view. Although such color model is implemented in the present embodiment, the present embodiments of the invention are equally well suited to other color models.

Figure 9:
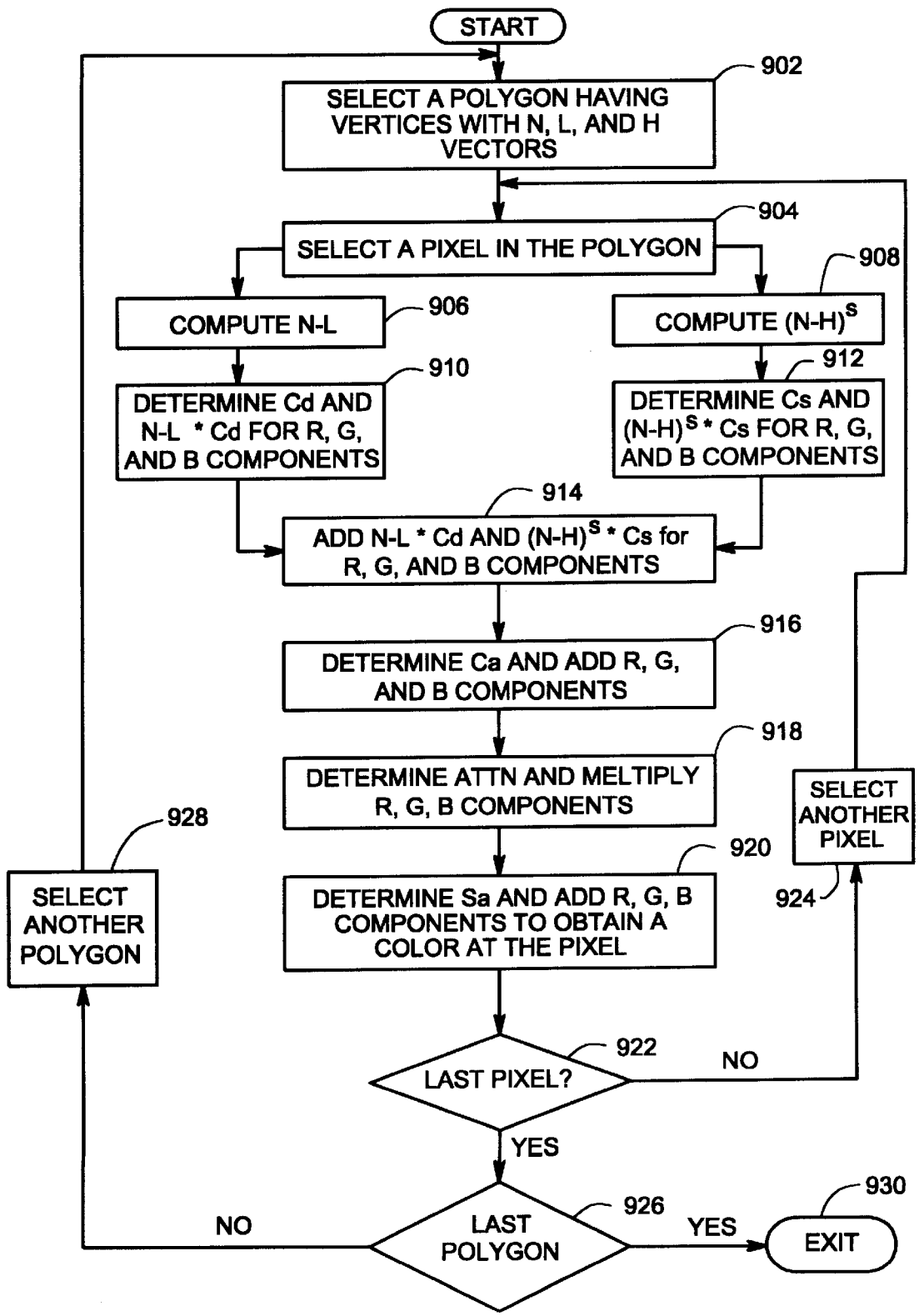
FIG. 9 illustrates a flow diagram for shading an image using Phong shading method according to a preferred embodiment of the present invention.

FIG. 9 illustrates a flow diagram for shading an image using Phong shading method according to a preferred embodiment of the present invention. The steps in the flow chart are implemented as program instructions stored in a computer readable memory units of computer graphics system 200 (FIG. 2) and is executed over processor 202.

At step 902 in FIG. 9, the present embodiment selects a polygon, preferably a triangle, having vertices with associated coordinates, normalized N, L, and H vectors, and a specular exponent, s. Then at step 904, a pixel within the polygon is selected for shading.

The present embodiment evaluates the diffuse term, N•L, at step 906 and the specular term, $(N \cdot H)^s$, at step 908 according to the methods detailed above. It should be obvious to those in the present art that the order in evaluating the diffuse term and the specular term is not crucial to the present embodiment. Either term may be computed before the other or both terms may be computed simultaneously in parallel.

After determining the diffuse and specular terms, the color for the selected pixel is determined according to the Phong lighting equation by incorporating the remaining well known prior art variables: Cd, Cs, Ca, Attn, and Sa. These remaining variables and the method of determining their values are well known in the art and have been routinely implemented in Phong shading equations without undue experimentation in graphics systems.

At step 910, the present embodiment determines the R, G, and B components of Cd, which accounts for diffuse light and material. Cd is defined as the product of diffuse color of light and diffuse color of material being shaded. In addition, the R, G, and B components of Cd are multiplied with the diffuse term.

At step 912, the R, G, and B components of Cs is determined and multiplied with the specular term. Cs is defined as the product of specular color of light and specular color of material being shaded. It stands for the specular color and material. At step 914, the individual R, G, and B components of the products obtained at steps 910 and 912 are added together to produce a sum.

Then in 916, the R, G, and B components of Ca is determined and added to the sum obtained in step 914. Ca accounts for ambient light and materials, and is defined as the product of ambient color of light and ambient color of material being shaded.

At step 918, the R, G, and B components of Attn is determined and multiplied with the R, G, and B components of the sum obtained in the previous step 916. Attn stands for the attenuation of light intensity of local and spot lights due to distance.

Then in step 920, the R, G, and B components of Sa, the ambient color of the scene, is determined and added to the R, G, B components of the product obtained in previous step 918. The R, G, and B components of this final sum is the R, G, and B components of the color of the pixel to be used in shading the pixel.

Then at steps 922 and 924, multiple iterations are performed to determine a color for shading at all pixels within the selected polygon. After all the pixels of the polygon have been accounted for, another polygon comprising an image is selected to determine colors for shading its pixels at steps 926 and 928. Finally, when all pixels for all triangles comprising an image have been determined and shaded, the process terminates at step 930. Although the present embodiment implements the Phong-Blinn equation, those in the relevant art will recognize that the present invention is equally suitable to other variations of the Phong lighting equation.

Figure 10:
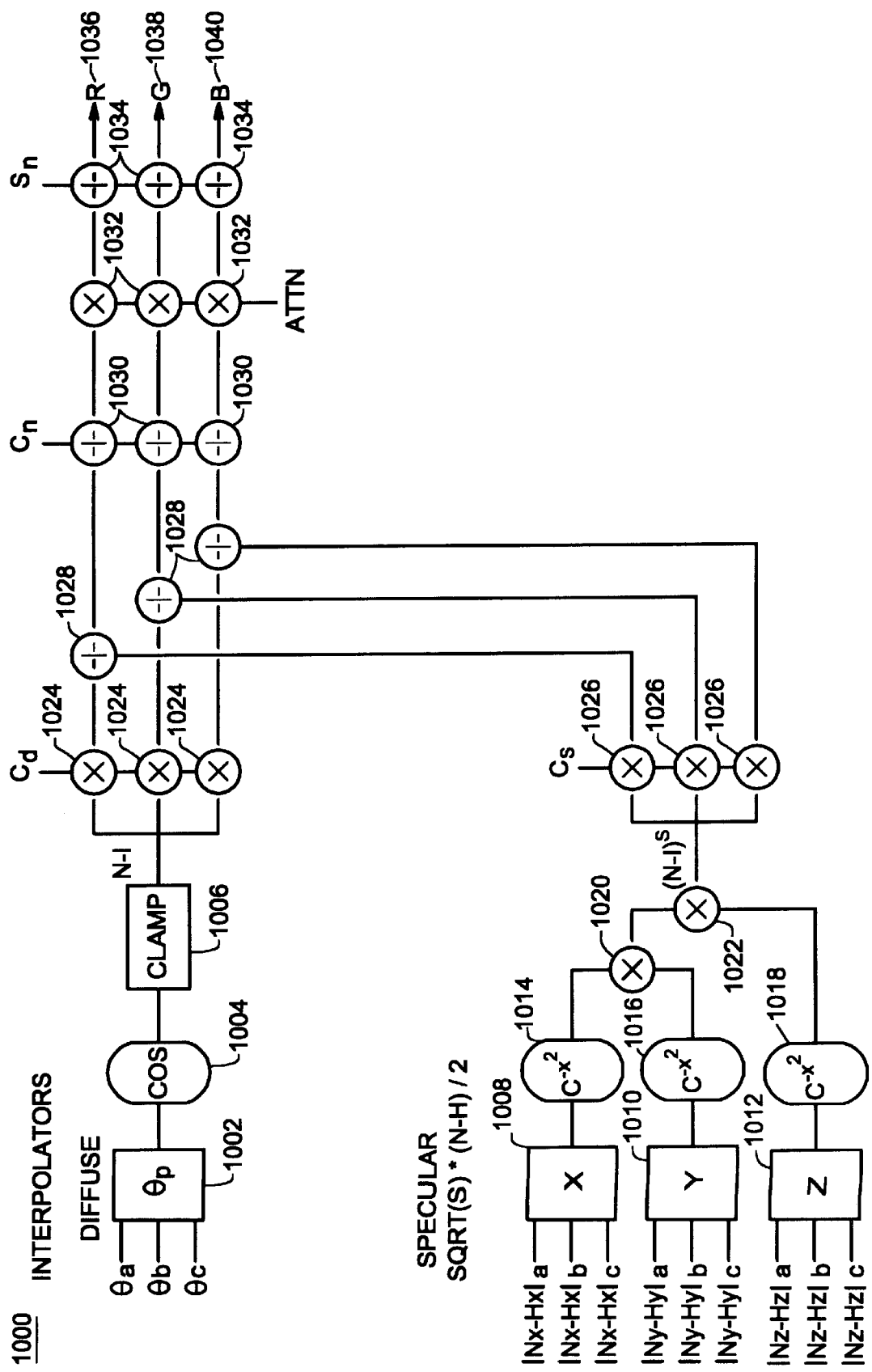
FIG. 10 illustrates a block diagram of an apparatus for implementing the Phong shading method according to a preferred embodiment of the present invention.

FIG. 10 illustrates a block diagram of an apparatus 1000 for implementing the Phong shading method according to a preferred embodiment of the present invention. Preferably, the apparatus is disposed in the graphics hardware card 210 of FIG. 2 and has access to the bus 214 to receive inputs.

In the present embodiment of the invention, an interpolator and a cosine look-up table are used in evaluating a diffuse term, N•L. A diffuse angle interpolator 1002 accepts the angles $\theta_a$, $\theta_b$, and $\theta_c$, representing the angles between N and L at the vertices a, b, and c of an exemplary triangle. The diffuse angle interpolator 1002 also accepts the coordinates of each of the vertices of the polygon as inputs (not shown). The diffuse angle interpolator 1002 then interpolates an angle $\theta_p$ for a given pixel in accordance with the embodiments of the present invention. The interpolated angle $\theta_p$ is then fed into a cosine look-up table (LUT) 1004 to generate its cosine value. The cosine value is then fed into a clamp 1006 which keeps it as a non-negative value. The clamp 1006 outputs a diffuse term, N•L.

The present embodiment also computes a specular term, $(N\cdot H)^s$. For example, difference term interpolators 1008, 1010, and 1012 for x, y, and z components, respectively, accept x, y, and z components of difference term $\sqrt{s}*(|N-H|)/\sqrt{2}$ for each of the vertices, a, b, and c of an exemplary triangle as shown in FIG. 10. The difference term interpolator 1008 interpolates the x component value of $\sqrt{s}*(|Np-Hp|)/\sqrt{2}$ based on the x components of N and H vectors for each vertex, a, b, and c. The difference term interpolator 1010 interpolates the y component value of $\sqrt{s}*(|Np-Hp|)/\sqrt{2}$ based on the y components of N and H vectors for each vertex, a, b, and c. Likewise, the difference term interpolator 1012 interpolates the z component value of $\sqrt{s}*(|Np-Hp|)/\sqrt{2}$ based on the z components of N and H vectors for each vertex, a, b, and c.

The x, y, and z components of the interpolated difference terms are then fed, as indexes, into Gaussian look-up tables (LUT) 1014, 1016, and 1018, respectively. The Gaussian look-up tables 1014, 1016, and 1018 outputs x, y, and z components of the specular term, respectively. These x, y, and z components of the specular term are then multiplied through multipliers 1020 and 1022 to produce a single specular term for a given pixel.

Based on the diffuse and specular terms, the color or intensity for a given pixel is determined in accordance with a Phong lighting equation. For example, the R, G, and B components of Cd are multiplied with the diffuse term through corresponding multipliers 1024 for each color component. Similarly, the R, G, and B components of Cs are multiplied with the specular term through corresponding multipliers 1026 for each color component. The R, G, and B components of the products of N•L*Ca and $(N\cdot H)^s$*Cs are separately added through the use of adders 1030 for each R, G, and B component to produce. Then, Attn is multiplied with the R, G, and B components of the sum of the terms Ca, N•L*Ca, and $(N\cdot H)^s$*Cs through the use of corresponding multipliers 1032. Finally, the R, G, and B components of Sa are added with the components of the product involving Attn through corresponding adders 1034 for each color component. The R, G, and B components of this final sum are the R 1036, G 1038, and B 1040 values of the color of the pixel to be used in shading. The R 1036, G 1038, and B 1040 are configured to pass the computed color values on to the computer graphics system 200 of FIG. 2 for further pixel processing.

The present invention, a method and system for shading 3D images comprised of a plurality of polygons within a computer graphics system, utilizes a Phong lighting equation. While the present invention has been described in particular embodiments, it should be appreciated that the present invention should not be construed as being limited by such embodiments, but rather construed according to the claims below.

What is claimed is:

1. In a graphics system, a method for shading an image comprised of polygons, said method comprising the steps of:

selecting a polygon of the image having vertices, each vertex having an x, y, and z coordinates, a normalized surface normal vector (N), a normalized half-angle vector (H), and a specular exponent (s);

computing a set of first difference terms between N and H for each of the vertices, one first difference term for each vertex;

computing a specular term according to a function: $\sqrt{s}*(|N-H|)/\sqrt{2}$;

selecting a pixel in the polygon;

calculating an index term corresponding to the pixel by interpolating a plurality of y terms;

storing a Gaussian look-up table in a memory unit coupled to the graphics system;

obtaining a specular term for the pixel by applying the index term to the Gaussian look-up table;

determining a color for the pixel by incorporating the specular term according to a lighting equation.

2. The method as recited in claim 1, wherein the polygon is a triangle.

3. The method as recited in claim 1, wherein the interpolation of the second difference term is a triangular bi-linear interpolation.

4. The method as recited in claim 1, wherein the interpolation of the second difference term is a linear interpolation.

5. The method as recited in claim 1, wherein the set of first difference terms between N and H for the vertices are computed separately for x, y, and z components at each vertex.

6. The method as recited in claim 5, wherein said second difference term is interpolated separately for x, y, and z components based on the x, y, and z components of the set of first difference terms.

7. The method as recited in claim 1, wherein the lighting equation is a Phong lighting equation.

8. The method as recited in claim 1, wherein the lighting equation is a Phong-Blinn lighting equation.

9. The method as recited in claim 1, wherein the image is line drawings.

10. The method as recited in claim 1, wherein the image is point drawings.

11. In a graphics system, a method for shading an image comprised of polygons, said method comprising the steps of:

selecting a polygon of the image having vertices, each vertex having x, y, and z coordinates, a normalized light source vector (L), a normalized surface normal vector (N), a normalized half-angle vector (H), and a specular exponent (s);

computing a set of first angles between N and L for each of the vertices, one first angle for each vertex;

computing a set of first difference terms between N and H for each of the vertices, one first difference term for each vertex, and wherein the set of first angles between N and L for each of the vertices are computed by taking a dot product between the vectors for each vertex;

selecting a pixel in the polygon;

interpolating a second angle based on the set of first angles;

computing a diffuse term for the pixel from the second angle, wherein the diffuse term is computed from the second angle by taking a cosine of the second angle;

interpolating a second difference term for the pixel based on the set of first difference terms;

computing a specular term for the pixel from the second difference term, wherein the specular term is computed according to a function: $\sqrt{s}*(|N-H|)/\sqrt{2}$; and determining a color for the pixel by incorporating the diffuse term and the specular term according to a lighting equation.

12. The method as recited in claim 11, wherein the polygon is a triangle.

13. The method as recited in claim 11, wherein the interpolation of the second angle is a triangular bi-linear interpolation.

14. The method as recited in claim 11, wherein the interpolation of the second angle is a bi-linear interpolation.

15. The method as recited in claim 11, wherein the diffuse term computing step further comprises the steps of:
   storing a cosine look-up table in a storage unit in the graphics system; and
   obtaining the diffuse term by using the second angle as an index to the cosine look-up table.

16. The method as recited in claim 11, wherein the set of first difference terms between N and H for the vertices are computed separately for x, y, and z components at each vertex.

17. The method as recited in claim 16, wherein said second difference term is interpolated separately for x, y, and z components based on the x, y, and z components of the set of first difference terms.

18. The method as recited in claim 17, wherein the specular term computing step further comprises the steps of:
   storing a Gaussian look-up table in a storage unit in the graphics system;
   computing an x, y, and z component for an index term $\sqrt{s}*(|N-H|)/\sqrt{2}$ corresponding to the second difference term for the pixel; and
   obtaining a specular term for the pixel by using the x, y, and z components of the index term to the Gaussian look-up table and multiplying the components together.

19. The method as recited in claim 11, wherein the specular term computing step further comprises the steps of:
   storing a Gaussian look-up table in a storage unit in the graphics system;
   computing an index term $\sqrt{s}*(|N-H|)/\sqrt{2}$ corresponding to the second difference term for the pixel; and
   obtaining a specular term for the pixel by using the index term to the Gaussian look-up table.

20. The method as recited in claim 11, wherein the interpolation of the second difference term is a triangular bi-linear interpolation.

21. The method as recited in claim 11, wherein the interpolation of the second difference term is a linear interpolation.

22. The method as recited in claim 11, wherein the lighting equation is a Phong lighting equation.

23. The method as recited in claim 11, wherein the lighting equation is a Phong-Blinn lighting equation.

24. The method as recited in claim 11, wherein the image is line drawings.

25. The method as recited in claim 11, wherein the image is point drawings.

26. A computer graphics display system for shading an image comprised of polygons, said system comprising:
   a bus;
   a processor coupled to the bus;
   a display device coupled to the bus;
   a computer readable memory unit coupled to the bus;
   polygon selecting means stored in the computer readable memory for selecting a polygon to shade, said polygon having vertices, each vertex having information corresponding to x, y, and z coordinates, a normalized light source vector (L), a normalized surface normal vector (N), a normalized half-angle vector (H), and a specular exponent (s);
   first angle evaluation means stored in the computer readable memory for computing a set of first angles between N and L for each of the vertices, one first angle for each vertex, wherein the first angle evaluation means computes a set of first angles between N and L for each of the vertices are computed by taking a dot product between the vectors for each vertex;
   first difference term evaluation means stored in the computer readable memory for computing a set of first difference terms between N and H for each of the vertices, one first difference term for each vertex;
   pixel selecting means stored in the computer readable memory for selecting a pixel within the polygon to shade;
   second angle interpolation means coupled to the bus for interpolating a second angle based on the set of first angles;
   diffuse term determination means coupled to the bus for evaluating a diffuse term for the pixel from the second angle, wherein the diffuse term determination means computes the diffuse term from the second angle by taking a cosine of the second angle;
   second difference term interpolation means coupled to the bus for interpolating a second difference term base on the set of first difference term;
   specular term determination means coupled to the bus for evaluating a specular term for the pixel from the second difference term, wherein the specular term is computed according to a function: $\sqrt{s}*(|N-H|)/\sqrt{2}$; and
   lighting equation application means coupled to the bus for applying the diffuse term and the specular term to generate a color value for the pixel according to a lighting equation.

27. The system as recited in claim 26, wherein the polygon is a triangle.

28. The system as recited in claim 26, wherein the diffuse term determination means further comprises:
   a cosine look-up table in the graphics system; and
   clamping means for keeping the diffuse term to a non-negative value.

29. The system as recited in claim 26, wherein the first difference term evaluation means computes a set of first difference terms between N and H for the vertices are computed separately for x, y, and z components at each vertex.

30. The system as recited in claim 26, wherein the specular term determination means further comprises:
   a Gaussian look-up table disposed in the graphics system;
   index term determination means for computing an index term, $\sqrt{s}*(|N-H|)/\sqrt{2}$, corresponding to the second difference term for the pixel such that the specular term for the pixel is obtained by using the index term to the Gaussian look-up table.

31. The system as recited in claim 26, wherein the second difference term interpolation means interpolates the x, y, and z components of the second difference term based on the x, y, and z components of the set of first difference terms.

32. The system as recited in claim 26, wherein the specular term determination means further comprises:
   a Gaussian look-up table disposed in the graphics system;
   index term determination means for computing the x, y, and z component for an index term $\sqrt{s}*(|N-H|)/\sqrt{2}$ corresponding to the second difference term for the pixel such that the specular term for the pixel is obtained by using the x, y, and z components of the index term to the Gaussian look-up table and multiplying the components together.

33. The system as recited in claim 26, wherein the lighting equation is a Phong lighting equation.

34. The system as recited in claim 26, wherein the lighting equation is a Phong-Blinn lighting equation.

35. The method as recited in claim 26 wherein the image is line drawings.

36. The method as recited in claim 26, wherein the image is point drawings.

* * * * *